March 13, 1951     A. H. GOLDEN     2,545,274
ADJUSTABLE FILTER DARKROOM LIGHT
Filed June 25, 1947     3 Sheets-Sheet 2
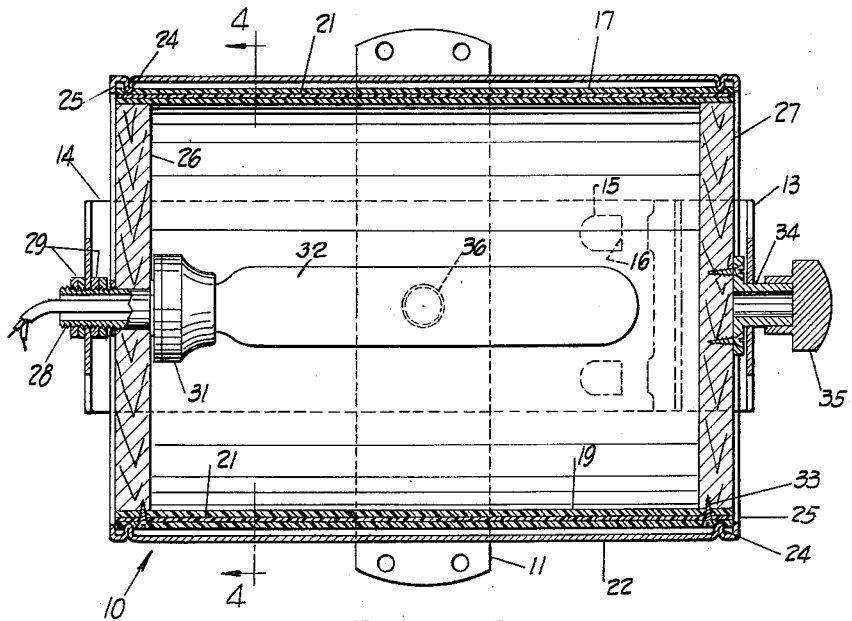
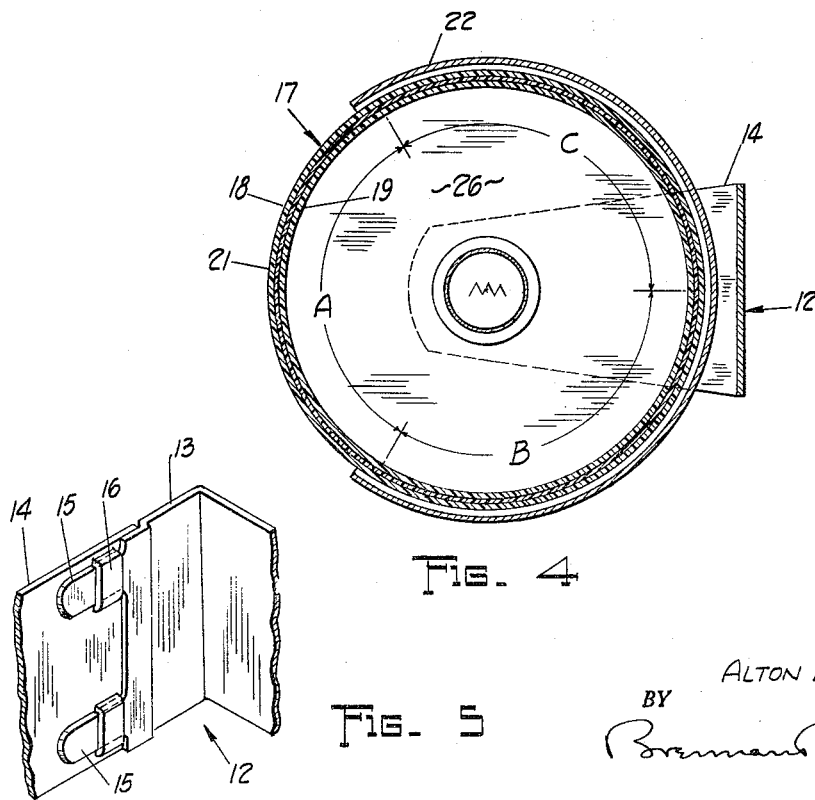
INVENTOR.
ALTON H. GOLDEN
BY
ATTY.

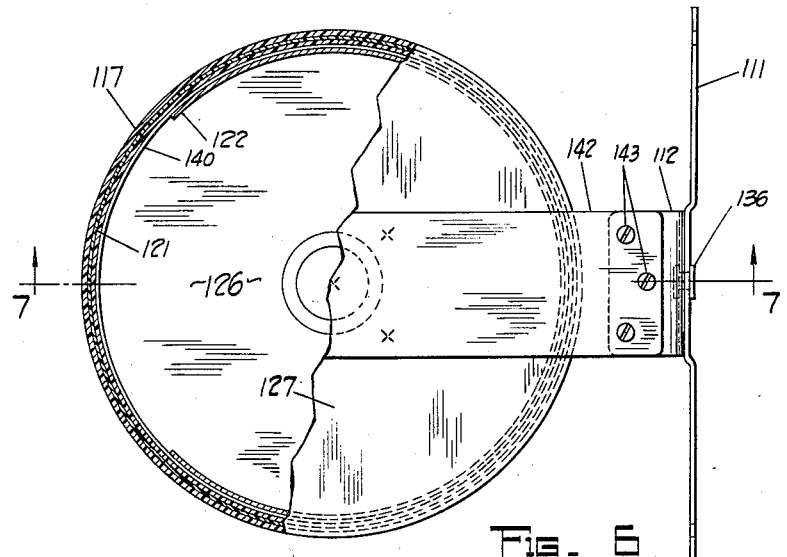
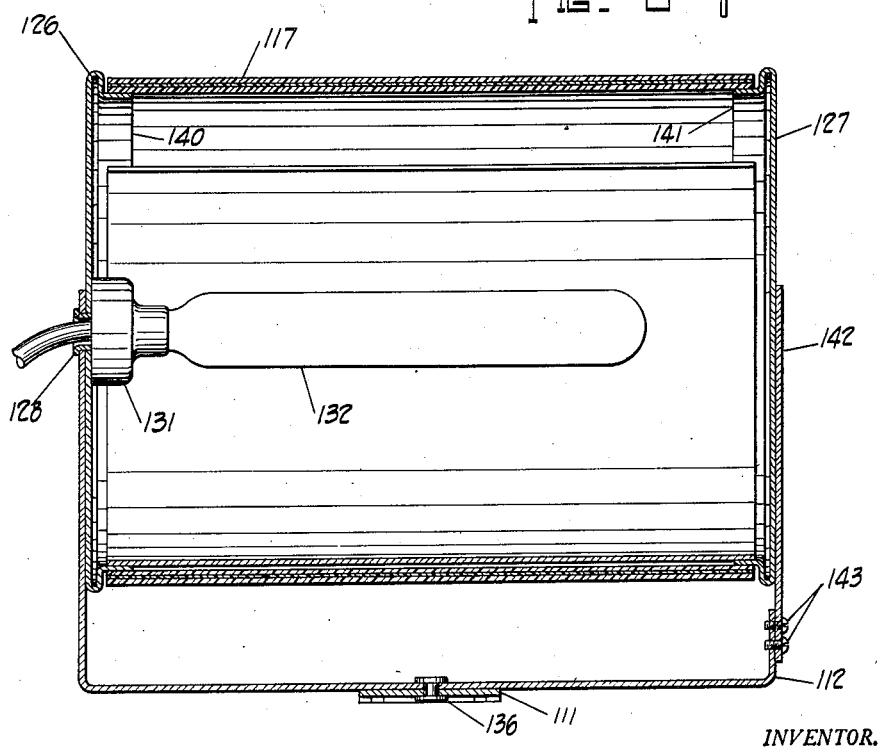

Patented Mar. 13, 1951

2,545,274

UNITED STATES PATENT OFFICE 2,545,274

ADJUSTABLE FILTER DARKROOM LIGHT

Alton H. Golden, East Cleveland, Ohio

Application June 25, 1947, Serial No. 756,978

3 Claims. (Cl. 240—20)

This invention relates to lights and light fixtures, especially to a light for a developing room for various types of photographic film.

Heretofore there have been some types of developing room lights provided, which lights have had suitable filters associated therewith, ordinarily in fixed relation thereto. These filters provided have been of standard construction and have comprised only one filter for a given light. However, due to the variety of types of films being produced at this time, it is necessary to use different filters for the different types of film being processed. Certain attempts have been made to produce filters or screen members which have different filter zones provided, which zones can be individually associated with a light generating source by assembly of the apparatus with the predetermined filter means in operative position. However, all of such filter devices having a plurality of different filter zones have been somewhat difficult to use in that certain assembly and disassembly of the apparatus was involved with each change of filter zones. As an operator may vary the type of film being processed quite frequently, or the individual film being processed may even require different filter means to be used at various stages of its processing, it obviously is undersiable, or even impossible, to have to vary the filter zone frequently, or during the processing of the film.

The general object of the present invention is to avoid and overcome the foregoing and other difficulties in and disadvantages of a variable filter light for developing rooms and to provide a new and improved developing room light that has a plurality of filter zones which can readily and easily be associated with the light, as desired.

Another object of the invention is to provide a compact developing room light which will retain a given position with any desired filter zone of the apparatus in operative position.

Another object of the invention is to provide a developing room light fixture that can be disassembled readily to change the bulb therein.

A further and more detailed object of the invention is to provide a transparent tubular member which has a plurality of longitudinally extending filter zones formed therein and to position a shade of cylindrical segmental shape adjustable with relation to the transparent sleeve so that the shade can be positioned to expose any desired filter zone for action.

The foregoing and other objects and advantages of the invention will be made apparent as the specification proceeds.

Attention is directed to the accompanying drawings, wherein:

Fig. 3 is a longitudinal section of the light of Fig. 1;

Fig. 4 is a vertical section on line 4—4 of Fig. 2;

Fig. 5 is a fragmentary perspective view of the joint between the mounting bracket sections;

Fig. 6 is an end elevation, partly in section, of a light embodying a modification of the invention; and Fig. 7 is a longitudinal section taken on the line 7—7 of Fig. 6.

Figure 1:
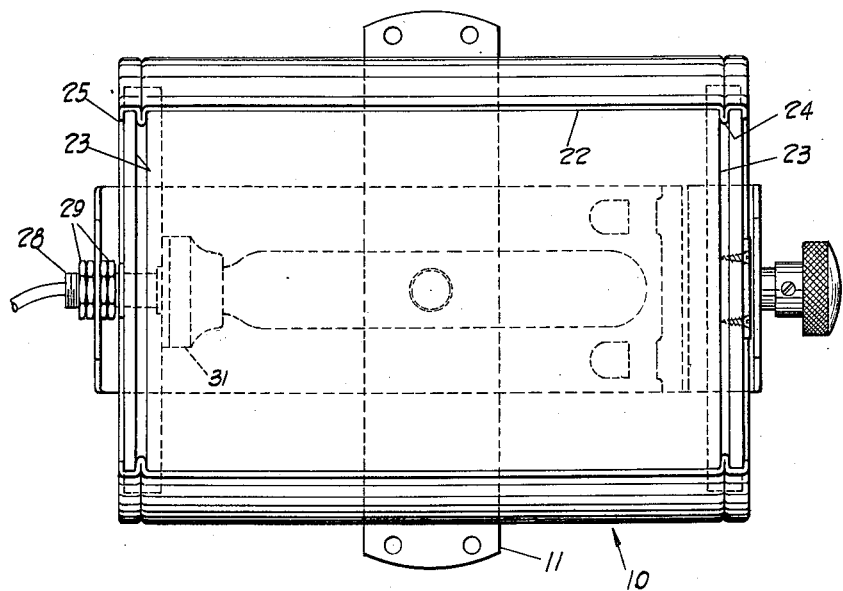
Fig. 1 is an elevation of a light for a developing room embodying the principles of the invention.

Referring to the details shown in the drawings, a dark room light indicated generally by the numeral 10 is shown and the light is adapted to be mounted on a wall bracket 11 which pivotally carries a split, U-shaped bracket 12 that positions the light fixture of the invention. The bracket 12 is shown as including end sections 13 and 14 that are adapted to be engaged by relative telescopic movement axially therebetween. The sections 13 and 14 are engaged by means of offset fingers 15 formed on the section 13 and engaged with offset arch or bridge sections 16 formed on the bracket section 14 adapted to receive the fingers 15 snugly therein. The split construction of the bracket 12 permits the dark room light of the invention to be disassembled readily so as to change the light bulb positioned therein, as hereinafter explained.

Figure 2:
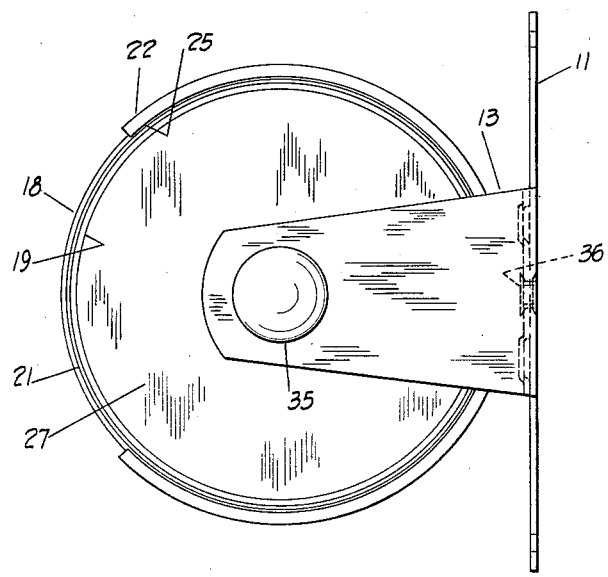
Fig. 2 is a right end elevation of the light of Fig. 1.

As a feature of the invention, the light 10 includes a cylindrical, or sleeve-like, transparent body member 17 which is made, ordinarily, from laminations of a transparent plastic, such as Lucite. The cylindrical member 17 has an outer shell 18 and an inner shell 19 between which longitudinally extending filter means such as a sheet 21 is positioned. The sheet 21 is formed from a plurality of segments of filter means of different properties so that the individual sections of the filter sheet can be used when desired with each different filter extending the complete length of the cylindrical body member 17. The exposure of the various filter means associated with the cylindrical body member 17 is controlled by means of a cylindrical shade 22 which is of such length circumferentially of the body member as to cover slightly more than two-thirds of the circumference thereof, as best shown in Fig. 2. The shade 22 is adjustably associated with and carried by the cylindrical body member 17 and to this end a recess 23 is formed in the cylindrical body member 17, adjacent each end thereof. The shade 22 is provided with a circumferentially extending bead 24 on its inner periphery adjacent each end thereof and these beads are adapted to engage with the circumferentially extending continuous recesses 23 formed in the cylindrical body member 17. The shade 22 may have end flanges 25 formed thereon but the shade must be of sufficient resiliency that one end thereof can be expanded slightly so as to telescope the shade over the cylindrical body member so as to engage the shade for operative association with such cylindrical body member 17.

Fig. 4 indicates that three circumferentially extending segments A, B and C are provided with relation to the cylindrical body member 17 and these segments indicate the different filter zones formed or provided in the cylindrical body member 17. Of course, there can be any desired number of zones provided in the light or light fixture of the invention and this embodiment of the invention provides for three of such filter zones. Preferably a red screen is provided in filter zone A, an amber screen in zone B and a green screen in filter zone C. Fig. 4 best shows that the opening in the shade 22 is of less circumferential extent than the filter zone so as to prevent any undesired light rays from passing through or out of the shade 22.

Preferably the cylindrical body member 17 is provided with opaque end sections 26 and 27 which may be made from any suitable material, such as wood or plastic. The end 26 receives a tube 28 which is secured to the end section 14 of the mounting bracket 12 by means of a plurality of lock nuts 29. The tube 28 is adapted to carry a socket 31 which carries a conventional light bulb 32 which is positioned within the dark room light 10. The connection between the end 26 and the tube 28 serves as a journal for the cylindrical body member 17 to permit rotation of the same on its longitudinal axis. The other end 27 for the member 17 is removably secured thereto by means of screws 33 whereas the end 26 is fixedly engaged with the body member in any desired manner. The end 27 is engaged with a trunnion 34 which is journaled in the end section 13 of the bracket 12. A knob 35 is secured to the outer end of the trunnion in any desired manner so that the knob 35 can be used to rotate the cylindrical body member 17 on its longitudinal axis. In order to effect the desired change between the shade 22 and the various filter segments, the operator of the light merely retains the shade 22 against rotative movement when turning the cylindrical body member 17 about its longitudinal axis by the knob 35. Of course, arcuate movement of both the body member and shade as a unit may be permitted at any time so as to vary the direction of the light flow from the light of the invention. Further adjustment of such direction of light flow from the light of the invention can, of course, be provided by rotating the cylindrical body member 17 and associated means as a unit about the wall bracket 11 since the U-shaped bracket 12 is pivotally supported to such wall bracket by means of a grommet or rivet 36.

When the light bulb 32 is to be changed, such action can be readily effected by moving the shade 22 so as to expose the screws 33 used to retain the end 27 in engagement with the cylindrical body member and, after removing the screws 33 holding the end to the body member, the entire bracket section 13, trunnion 34, and associated members can be easily withdrawn with relation to the remainder of the apparatus whereby one end of the cylindrical body member 17 is exposed.

A modified form of the light of the invention is shown in Figs. 6 and 7 and in this instance the shade member is positioned within rather than without the transparent filter carrying cylinder of the light. These figures show that the cylindrical body member 117 carries a filter sheet 121 between the laminations thereof, and that an arcuate shade 122, extending the length of the body member 117 is carried within the bore of the body member. One end of the shade 122 is suitably secured to an inwardly extending cylindrical flange 140 formed on a metallic end disk 126. One end of the cylindrical body member 117 is engaged with and rotatably carried on this flange 140 and the other end of member 117 is correspondingly mounted on a similar flange 141 formed on a second end member 127. The flange 141 normally receives the opposite end of the shade 122 therein and makes a snug engagement therewith so as to prevent passage of light therebetween. Fig. 7 shows that the end 127 may be welded to a bracket section 142 which is removably engaged with a bracket 112 by screws 143 that in turn pivotally engages the wall bracket 111 by a suitable grommet 136. Thus, as in the preferred embodiment of the invention, the dark room light may be rotated as a unit in a plane including its longitudinal axis and parallel to the bracket 111. Such mounting members are adapted to give a variable mounting position to the light and enable it to retain any given position. In this modified embodiment of the invention, a light 132 is positioned within the cylindrical body member 117 by means of a socket 131 that is associated with a grommet or tube 128 which is secured to the bracket 112. The tube 128 journals the end 126 on the bracket 112 so that the end 126 associated with the cylindrical body member 117 can be used by the operator for turning the shade 122 arcuately with relation to the body member 117 by holding the member 117 in one position to expose any desired filter zone in the filter sheet 121.

To change the light bulb 132, the removable bracket section 142 is taken off by the removal of the screws 143 and the end member 127 can be telescoped out of engagement with the cylindrical body member 117 so as to expose the interior of the dark room light.

From the foregoing description of the invention, it will be seen that an easily adjustable dark room light device is provided which can be adapted for use with any commercial type of film without damage to such film during its development or other processing. While a laminated cylindrical transparent body member is shown in both embodiments of the invention, this member can obviously be made of one thickness or a frame of a transparent material, when desired, as long as the sectional filter elements can be suitably associated therewith, as by gluing. Any conventional mounting brackets may be used in place of the specific brackets disclosed, although provision must always be made for partial disassembly of the apparatus to permit change of the light bulb should it burn out or should a different power bulb be desired. The light bulb or light bulb fixture of the invention is easily constructed from conventional materials and is adapted for a long service life with a minimum of maintenance thereon.

While two embodiments of the invention have been completely illustrated and disclosed herein, modification of such constructions may be made without departing from the scope of the invention as defined in the appended claims.

Having thus described my invention, what I claim is:

1. A light of the class described comprising a tubular filter member having a plurality of longitudinally extending zones extending the full length of said filter member and having different light filter characteristics, said filter member having a circumferentially extending groove formed in its outer surface, an open end resilient arcuate shade partially encompassing said filter member and extending the length thereof, said shade having a circumferentially extending bead formed on its inner surface resiliently engaged with the groove in said filter member to permit controlled relative arcuate movement therebetween, an electric light associated with and positioned within said filter member, end members positioned within said filter member, and means engaged with said end members to position said filter member and shade for arcuate movement on their longitudinal axes whereby any desired zone of said filter member can be exposed by relative movement between said filter member and shade.

2. A developing room light comprising a split mounting bracket, a transparent cylindrical member having a circumferentially extending recess formed in its periphery adjacent each end thereof, colored filter means for arcuate circumferentially spaced sections of said cylindrical member, said cylindrical member being journaled on said bracket for rotation about its longitudinal axis, an arcuate shade having an open segment extending longitudinally thereof to expose part of said cylindrical member, said shade being adapted to be expanded out and telescoped over said cylindrical member and engage resiliently therewith, opaque end members for said cylindrical member, at least one of said end members being removably secured to said cylindrical member, journal means connecting said end members to said bracket, said shade being provided with circumferentially extending beads on the inner surface thereof that engage with the recesses in said cylindrical member to position said shade thereon in fixed association therewith and adapt it for relative arcuate movement with relation thereto, a light positioned inside of said cylindrical member, and means for rotating said cylindrical member on said bracket and with relation to said shade to expose any desired portion of said filter means, said shade being carried by said cylindrical member for arcuate movement with relation thereto.

3. A light of the class described comprising an arcuate filter member having a plurality of longitudinally extending arcuate circumferentially spaced uniform size zones of different light filter characteristics, an arcuate shade adjustably positioned on the outer surface of said filter member and of an arcuate length equal to said filter member less one zone thereof, an electric light associated with said filter member within the arc defined thereby, end members for said filter member positioned within same, means engaged with said end members to position said filter member and shade for arcuate movement on their longitudinal axis whereby any desired zone of said filter member can be exposed, and handle means secured to one of said end members to facilitate rotation of said filter member on its longitudinal axis, said shade being engageable manually and rotatably carried by said filter member to enable the said handle means to set the desired zone of said filter member at the opening in said shade.

ALTON H. GOLDEN.

REFERENCES CITED

The following references are of record in the file of this patent:

UNITED STATES PATENTS

| Number | Name | Date |
|---|---|---|
| 400,140 | Stockly | Mar. 26, 1889 |
| 548,369 | Kinsman | Oct. 22, 1895 |
| 605,529 | Ward | June 14, 1898 |
| 1,374,714 | Bell | Apr. 12, 1921 |
| 1,891,971 | Crane | Dec. 27, 1932 |
| 1,997,687 | Hoegger | Apr. 16, 1935 |
| 2,297,974 | Moore | Oct. 6, 1942 |

FOREIGN PATENTS

| Number | Country | Date |
|---|---|---|
| 412,240 | Germany | Apr. 16, 1925 |